(12) United States Patent
Ichinose et al.

(10) Patent No.: US 9,002,588 B2
(45) Date of Patent: Apr. 7, 2015

(54) DUMP VEHICLE OVERTURN PREVENTING DEVICE

(71) Applicant: Hitachi Construction Machinery Co., Ltd., Bunkyo-Ku, Tokyo (JP)

(72) Inventors: Masanori Ichinose, Tsukuba (JP); Tomohiko Yasuda, Kashiwa (JP); Takayuki Sato, Kashiwa (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 14/152,098

(22) Filed: Jan. 10, 2014

(65) Prior Publication Data

US 2014/0129097 A1 May 8, 2014

Related U.S. Application Data (63) Continuation of application No. 13/505,749, filed as application No. PCT/JP2010/072133 on Dec. 9, 2010, now Pat. No. 8,670,906.

(30) Foreign Application Priority Data

Dec. 10, 2009 (JP) .................. 2009-280709

(51) Int. Cl.
 *B60P 1/56* (2006.01)
 *B60P 1/04* (2006.01)
 *B60P 1/28* (2006.01)
(52) U.S. Cl.
 CPC . *B60P 1/04* (2013.01); *B60P 1/045* (2013.01); *B60P 1/283* (2013.01)
(58) Field of Classification Search
 USPC ...................................... 701/49, 50
 See application file for complete search history.

(56) References Cited

U.S. PATENT DOCUMENTS

| 3,464,755 | A | 9/1969 | Brown |
| 4,839,835 | A | 6/1989 | Hagenbuch |
| 2007/0200418 | A1 * | 8/2007 | Takeda et al. .................. 298/1 R |

FOREIGN PATENT DOCUMENTS

| EP | 0 162 608 | 11/1985 |
| JP | 59-135248 | 9/1984 |

(Continued)

OTHER PUBLICATIONS

European Search Report issued in European Patent Application No. 10836032.2 on Jun. 13, 2014.

(Continued)

*Primary Examiner* — Mary Cheung
*Assistant Examiner* — Yuen Wong
(74) *Attorney, Agent, or Firm* — Baker Botts L.L.P.

(57) ABSTRACT

A dump vehicle overturn preventing device includes: a loaded weight estimation unit which estimates loaded weight on the body; a vehicle rotation moment calculation unit which calculates a vehicle rotation moment Mb caused by movement of the dump vehicle's load upon discharging of the load; a reference moment calculation unit which determines a reference moment Ms not greater than an overturn threshold moment MI which is the minimum value of a rotation moment required to lift the front wheels off the ground; a judgment unit which judges whether or not the vehicle rotation moment Mb has exceeded the reference moment Ms; and a display device which notifies the driver that there is a probability of an overturn of the vehicle when the vehicle rotation moment Mb is judged to have exceeded the reference moment Ms.

9 Claims, 8 Drawing Sheets

(56) References Cited

FOREIGN PATENT DOCUMENTS

| | | |
|---|---|---|
| JP | 62-43887 | 9/1987 |
| JP | 63-98235 | 6/1988 |
| JP | 63-48633 | 9/1988 |
| JP | 2002-307996 | 10/2002 |
| WO | PCT/JP2010/072133 | 12/2010 |

OTHER PUBLICATIONS

Office Action issued in Chinese Patent Application No. 201080055708.7 on Jun. 13, 2014.

Discharge Stability Design of Container Waste Truck, Liu Haiyun, in Mar. 2003.

* cited by examiner

DUMP VEHICLE OVERTURN PREVENTING DEVICE

CLAIM OF PRIORITY

This application is a continuation of application Ser. No. 13/505,749, filed on Jun. 8, 2012, now allowed, which claims the benefit of Japanese Application No. JP 2009-280709, filed Dec. 10, 2009, in the Japanese Patent Office, which is a 371 national stage application of International Application No. PCT/JP2010/072133, filed Dec. 9, 2010, the disclosures of which are incorporated herein by reference.

TECHNICAL FIELD

The present invention relates to a dump vehicle overturn preventing device for preventing a dump vehicle from overturning when the load is discharged from the dump vehicle by tilting its body.

BACKGROUND ART

Dump vehicles, for carrying a load (object of transportation) such as excavated earth and sand to a dumping site and discharging the load by tilting the body, are used at quarries, mines, etc. When a dump vehicle is parked on irregular ground or sloping ground, the dump vehicle may fall into an unstable state due to tilting of the vehicle itself, fragility of the ground, etc. As its body is tilted to discharge the load in such a state, the barycenter of the entire vehicle rises due to the tilting of the body which causes the vehicle to become unstable and possibly overturn. There has been known a technique for preventing the overturn upon discharging of a load, in which the tilt angle of the vehicle is monitored using measurement means such as an angle meter and the tilting action of the body is restricted when the tilt angle has increased to a prescribed angle or more (see Patent Document 1).

PRIOR ART DOCUMENT

Patent Document

Patent Document 1: JP,A 2002-307996

SUMMARY OF THE INVENTION

Problem to be Solved by the Invention

When a dump vehicle discharges its load by tilting the body, the earth/sand (load) generally collapses gradually from its lower part with the increase in the tilt angle of the body and the collapsed earth/sand slides down along the tilted body to be discharged. However, in cases where the load adheres to the body due to reasons such as high viscosity of the load, the entire load may slide down in a lump as the tilt angle of the body exceeds a certain angle. This may break the dynamic balance of the chassis and cause the vehicle to overturn. Thus, intending to prevent overturning of a vehicle by just monitoring the static balance (tilt angle of the vehicle) as in the technique of the aforementioned Patent Document 1 is not necessarily sufficient in some cases.

The object of the present invention, which has been made in consideration of the above problem, is to provide a dump vehicle overturn preventing device for preventing overturning of a vehicle caused by its load sliding down from its body in a lump.

Means for Solving the Problem

To achieve the above object, the present invention provides an overturn preventing device for a dump vehicle equipped with a body rotatably supported on a frame and hoist cylinders that expand and contract to rotate the body around its rotation axis, the device comprising: loaded weight estimation means which estimates loaded weight on the body; vehicle rotation moment calculation means which calculates a vehicle rotation moment caused by movement of the dump vehicle's load upon discharging of the load based on the loaded weight estimated by the loaded weight estimation means; reference moment calculation means which calculates the minimum value of the rotation moment required to lift the front wheels of the vehicle off the ground and sets a reference moment not greater than the minimum value; judgment means which judges whether or not the vehicle rotation moment calculated by the vehicle rotation moment calculation means has exceeded the reference moment calculated by the reference moment calculation means; and notification means which notifies the driver that there is a probability of an overturn of the vehicle when the judgment means judges that the vehicle rotation moment has exceeded the reference moment.

Effect of the Invention

The present invention prevents overturning of a vehicle caused by its load sliding down from its body in a lump.

MODE FOR CARRYING OUT THE INVENTION

Referring to the drawings, a description will be given in details of preferred embodiments in accordance with the present invention.

Figure 1:
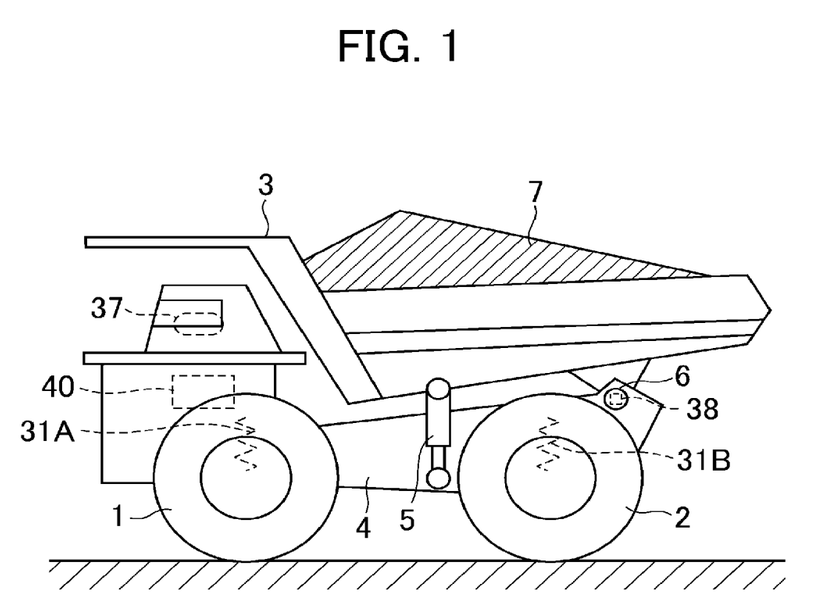
FIG. 1 is an overall schematic diagram of a dump vehicle in accordance with an embodiment of the present invention.

FIG. 1 is an overall schematic diagram of a dump vehicle in accordance with an embodiment of the present invention.

Figure 2:
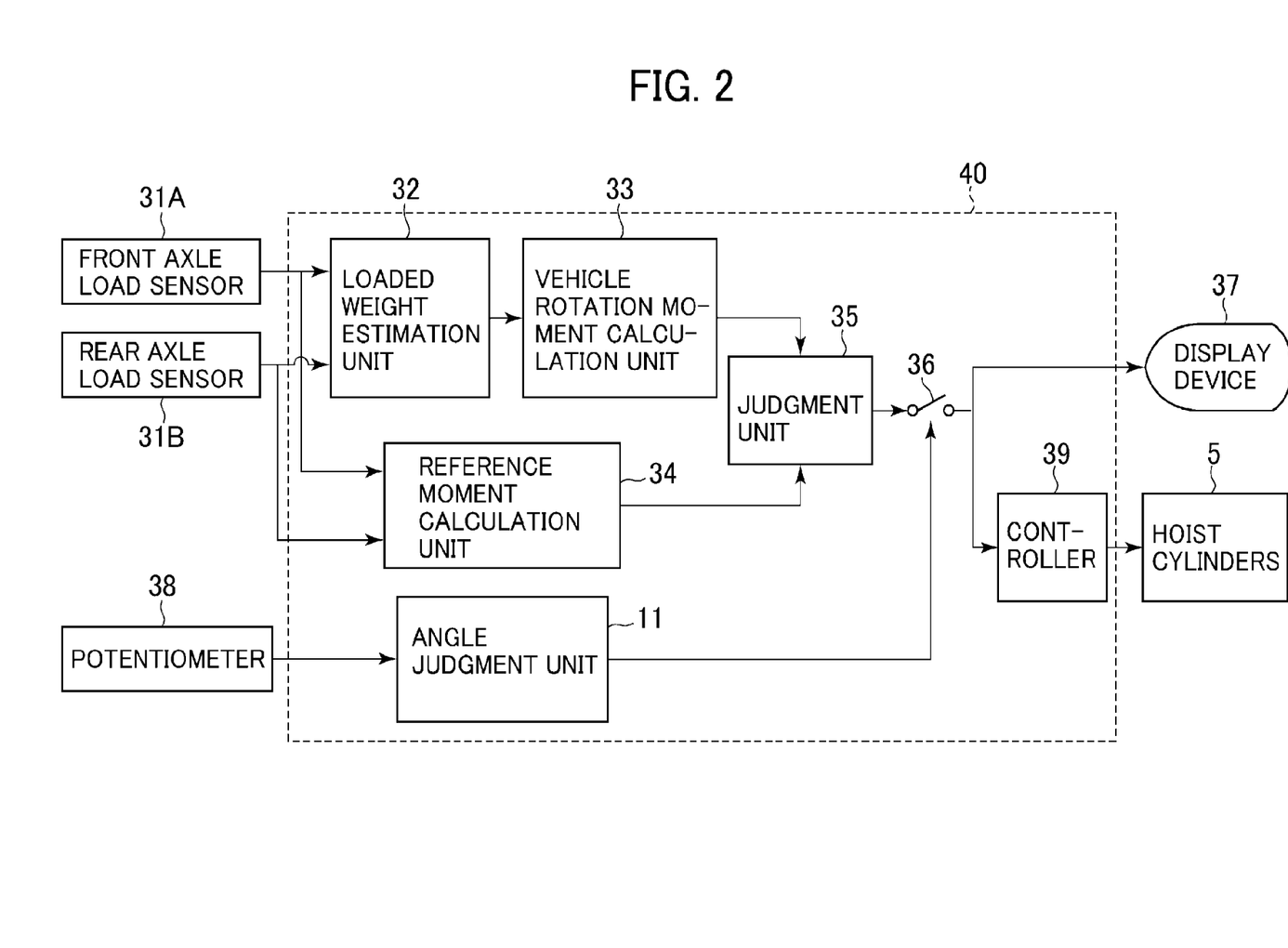
FIG. 2 is an overall block diagram of a dump vehicle overturn preventing device in accordance with a first embodiment of the present invention.

FIG. 2 is an overall block diagram of a dump vehicle overturn preventing device in accordance with a first embodiment of the present invention.

The dump vehicle shown in the figure mainly comprises front wheels 1 and rear wheels 2 each attached to the front and rear part of a frame 4, a body 3 rotatably supported on the frame 4 via a support shaft 6, hoist cylinders 5 that expand and contract to rotate the body 3 around the support shaft 6, a main control device 40 of the dump vehicle overturn preventing device, and a display device (notification means) 37 installed in the cab.

The front wheels 1 are equipped with a front axle load sensor (front axle load detecting means) 31A for detecting the total load acting on the front wheels 1. The rear wheels 2 are equipped with a rear axle load sensor (rear axle load detecting means) 31B for detecting the total load acting on the rear wheels 2. In other words, the front axle load sensor 31A detects the load acting on the front of the vehicle and the rear axle load sensor 31B detects the load acting on the rear of the vehicle. These sensors 31A and 31B may be configured by force sensors attached to suspension mechanisms for the front and rear wheels 1 and 2, for example. In cases where the suspension mechanisms for the front and rear wheels 1 and 2 are configured with hydraulic mechanisms, for example, the loads acting on the front and rear wheels 1 and 2 can be detected with ease by measuring pressures inside hydraulic cylinders supporting the suspension mechanisms for the front and rear wheels 1 and 2, respectively.

Main components such as the drive system and the cab seat are mounted on the frame 4. The vehicle is capable of freely traveling on the road surface with the front and rear wheels 1 and 2. When the hoist cylinders 5 are expanded, the front end of the body 3 raises and the tilt angle increases while the body 3 rotates around the support shaft 6. With this movement, the load 7 (object of transportation) loaded on the body 3 can be discharged from the rear end of the body 3. The support shaft 6 is equipped with a potentiometer (rotary potentiometer) 38 for measuring the rotation angle of the support shaft 6, as angle detecting means for detecting the tilt angle of the body 3 with respect to the frame 4.

In the dump vehicle overturn preventing device shown in FIG. 2, the main control device 40 includes a loaded weight estimation unit (loaded weight estimation means) 32, a vehicle rotation moment calculation unit (vehicle rotation moment calculation means) 33, a reference moment calculation unit (reference moment calculation means) 34, a judgment unit (judgment means) 35 and a cylinder controller (cylinder control means) 39.

The loaded weight estimation unit 32 is connected with the front axle load sensor 31A and the rear axle load sensor 31B. The loaded weight estimation unit 32 estimates the weight "m" of the load 7 (loaded weight) by subtracting the empty weight of the dump vehicle from the sum total of load data (detected values) acquired from the front axle load sensor 31A and the rear axle load sensor 31B.

The reference moment calculation unit 34 is connected with the front axle load sensor 31A and the rear axle load sensor 31B. The reference moment calculation unit 34 calculates an overturn threshold moment MI (explained later) based on the load data acquired from the front axle load sensor 31A and the rear axle load sensor 31B and then sets a reference moment Ms not greater than the calculated overturn threshold moment MI.

Here, the overturn threshold moment MI represents the vehicle rotation moment of when the load on the front wheels 1 falls below 0, that is, the minimum value of a rotation moment around the rear wheels 2 (fulcrum) required to lift the front wheels 1 off the ground. The overturn threshold moment MI is acquired by calculating the barycentric position of the vehicle from the load data acquired from the front axle load sensor 31A and the rear axle load sensor 31B. The reference moment Ms is used as the reference for judging whether or not to notify the driver via the display device 37 that there is a strong probability of the vehicle to overturn. The reference moment Ms is set at a value not greater than the overturn threshold moment MI. While it is possible to directly use the calculated overturn threshold moment MI as the reference moment Ms, overturning of the vehicle can be prevented with higher reliability as smaller the reference moment Ms is set than the overturn threshold moment MI.

An example of a method for calculating the overturn threshold moment MI will be explained. Let "Lw" represent the distance between the front wheels 1 and the rear wheels 2 of the dump vehicle (i.e., the wheelbase), "Ff" represent wheel reaction force determined based on the load data acquired from the front axle load sensor 31A, "Fr" represent wheel reaction force determined based on the load data acquired from the rear axle load sensor 31B, and "F" represent the total load (F=Ff+Fr). The distance Lr from the rear wheels 2 to the barycenter is represented by the following expression (1).

$$Lr = Lw \times (Ff/F) \quad (1)$$

Meanwhile, the overturn threshold moment MI required to lift the total load F around the rear wheels 2 is represented by the following expression (2).

$$MI = Lr \times F \quad (2)$$

Thus, by substituting the expression (1) into the expression (2), the overturn threshold moment MI can be represented by the following expression (3).

$$MI = Lw \times Ff \quad (3)$$

The vehicle rotation moment calculation unit 33 is connected with the loaded weight estimation unit 32. The vehicle rotation moment calculation unit 33 calculates a vehicle rotation moment caused by movement of the load 7 upon its discharging based on the loaded weight estimated by the loaded weight estimation unit 32. The vehicle rotation moment is the moment exerted when the body 3 rotates around the support shaft 6 to discharge the load 7 (object of transportation). The vehicle rotation moment takes a high value when the load 7 slides down from the body 3 in a lump. The vehicle rotation moment calculation unit 33 in this embodiment calculates a vehicle rotation moment that is expected to occur when the load 7 slides down from the body 3 in a lump.

Next, an example of a method for calculating the vehicle rotation moment will be explained below referring to FIG. 3.

Figure 3:
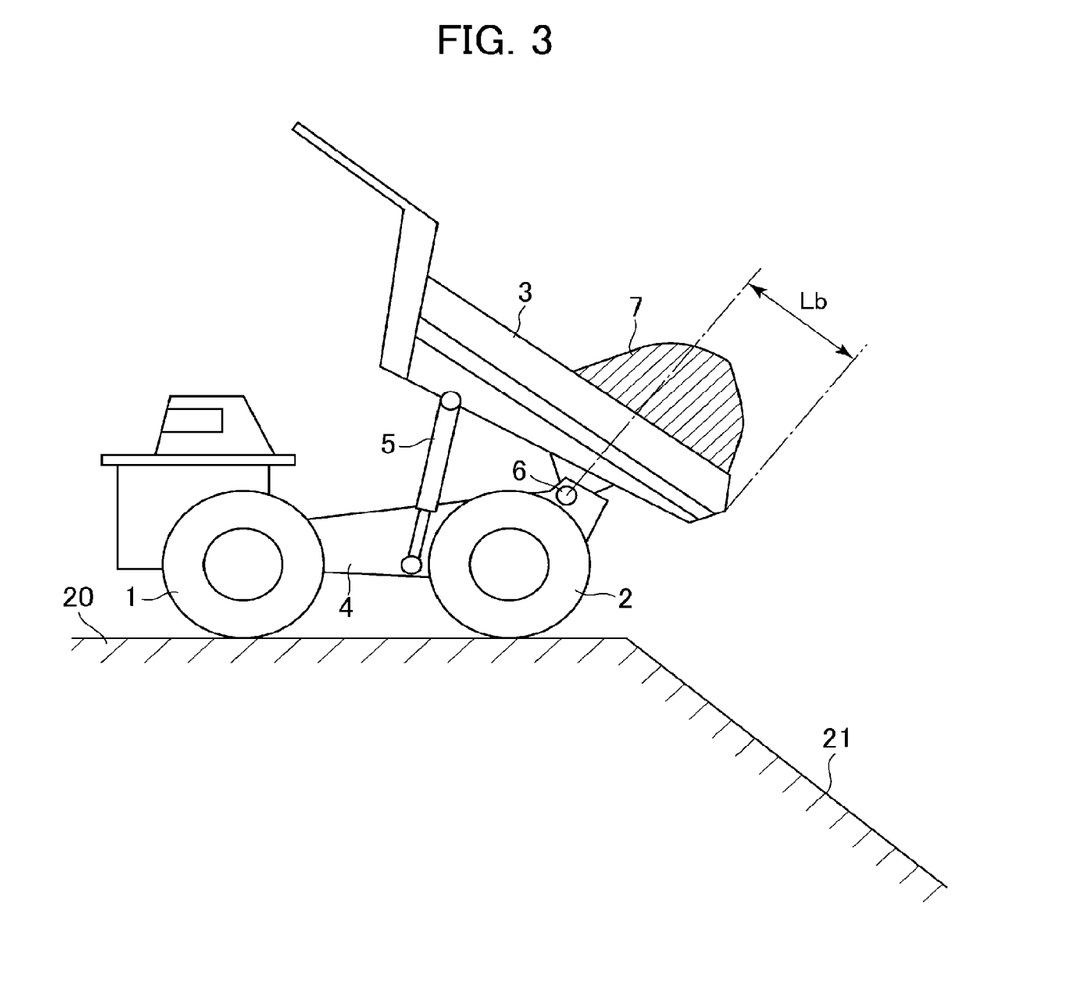
FIG. 3 is a side view showing the dump vehicle in accordance with the first embodiment of the present invention when the dump vehicle is discharging the load.

FIG. 3 is a side view showing the dump vehicle in accordance with the first embodiment of the present invention where the vehicle is discharging the load 7. In this figure, when the load 7 moves to the rear part of the body 3 in a lump, the body 3, which is rotatable around the support shaft 6 as the fulcrum, receives a rotation moment (clockwise in FIG. 3) due to the weight of the load 7. Let "m" represent the loaded weight estimated by the loaded weight estimation unit 32, "g" represent the gravitational acceleration, and "θ" represent the tilt angle of the body 3 with respect to the horizontal plane. The rear end of the body 3 receives a load up to a maximum of m×g×cos θ on the assumption that the load 7 slides down in a lump upon discharging. Thus, let "Lb" represent the distance from the support shaft 6 to the rear end of the body 3, the vehicle rotation moment Mb occurring when the load 7 slides down from the body 3 in a lump can be represented by the following expression (4).

$$Mb = Lb \times m \times g \times \cos\theta \qquad (4)$$

Incidentally, the tilt angle θ of the body 3 with respect to the horizontal plane can be acquired by using an angle sensor that detects the tilt angle of the body 3 with respect to the horizontal plane, or by adding up detected values of the potentiometer 38 and an angle sensor that detects the tilt angle of the frame 4 with respect to the horizontal plane, for example.

Returning to FIG. 2, the judgment unit 35 is connected with the vehicle rotation moment calculation unit 33 and the reference moment calculation unit 34. The judgment unit 35 judges whether the vehicle rotation moment Mb exceeds the reference moment Ms or not based on the values of the moments Mb and Ms inputted from the vehicle rotation moment calculation unit 33 and the reference moment calculation unit 34. In the case where the reference moment calculation unit 34 sets the reference moment Ms at a value equal to the overturn threshold moment Ml, the judgment unit 35 uses the following expression (5) derived from the above expressions (3) and (4) to judge the probability of the vehicle to overturn.

$$Lb \times m \times g \times \cos\theta > Lw \times Ff \qquad (5)$$

When the judgment unit 35 judges that the expression (5) holds, there is a strong probability that the front wheels 1 lift and the state of the vehicle turns unstable since the front/rear weight distribution of the vehicle shifts to the rear of the vehicle when the load 7 is discharged in a lump. In this case, the judgment unit 35 transmits a signal for making the display device 37 display information indicating that there is a strong probability of the vehicle to overturn. The judgment unit 35 may also be configured to transmit a signal for reducing the expansion speed of the hoist cylinders 5 or for stopping the expansion of the hoist cylinders 5 to the cylinder controller 39, in addition to or in place of the signal transmitted to the display device 37.

The display device 37 (e.g., high-definition LCD (Liquid Crystal Display) monitor) is connected with the judgment unit 35. The display device 37 is set at a position in the cab easily viewable to the driver. When the judgment unit 35 judges that the vehicle rotation moment Mb has exceeded the reference moment Ms, information (characters, figures, signs, combination thereof, etc.) indicating that there is a strong probability of an overturn of the vehicle is displayed on the display device 37. The notification by the display device 37 indicating a strong probability of the vehicle to overturn allows the driver to recognize that there is a possibility of the vehicle to overturn. Incidentally, while the display device 37 is taken as an example of the means for notifying the driver of a strong probability of an overturn of the vehicle (notification means) in this embodiment, the notification may also be made by providing a warning lamp arranged in the meter panel of the cab, a device such as a buzzer that makes a warning sound, etc.

The cylinder controller 39 is connected with the judgment unit 35. The cylinder controller 39 reduces the expansion speed of the hoist cylinders 5 or stops the expansion of the hoist cylinders 5 when the judgment unit 35 judges that the vehicle rotation moment Mb has exceeded the reference moment Ms. As a guideline, the expansion speed of the hoist cylinders 5 after the control by the cylinder controller 39 may be set at a speed that is lower than a speed at which the load 7 is not discharged in a lump.

A switch 36 connecting/disconnecting the judgment unit 35 to/from the display device 37 and the cylinder controller 39 may also be provided as shown in FIG. 2. The switch 36, which is connected with an angle judgment unit 11, is properly opened and closed depending on the tilt angle of the body 3 detected by the potentiometer 38.

The angle judgment unit 11, which is connected with the potentiometer 38, judges whether or not the tilt angle detected by the potentiometer 38 has exceeded a preset angle. The preset angle is an angle (angular value) stored in the angle judgment unit 11 (or in a storage unit (unshown) of the main control device 40, etc.). The preset angle represents a tilt angle of the body 3 at which a vehicle rotation moment so strong as to overturn the vehicle will not occur. For example, when the preset angle is set at an angle such that a load having low viscosity (e.g., earth and sand) would naturally crumble down and be discharged from the body 3 as the body 3 is tilted to that angle, the load on the body 3 can be presumed to have high viscosity if the load remains on the body 3 even when the body 3 is tilted over the preset angle. In this case, it is clear that there is a strong probability of the load sliding down in a lump and it is highly necessary to consider the risk of the overturning of the vehicle.

The angle judgment unit 11 is configured to close the switch 36 when the tilt angle detected by the potentiometer 38 is judged to exceed the preset angle and to open the switch 36 otherwise. With this configuration, the displaying of the information indicating a strong probability of the vehicle to overturn on the display device 37 and the speed control of the hoist cylinders 5 by the cylinder controller 39 are carried out only when the value (angle) detected by the potentiometer 38 is greater than the preset angle.

Figure 4:
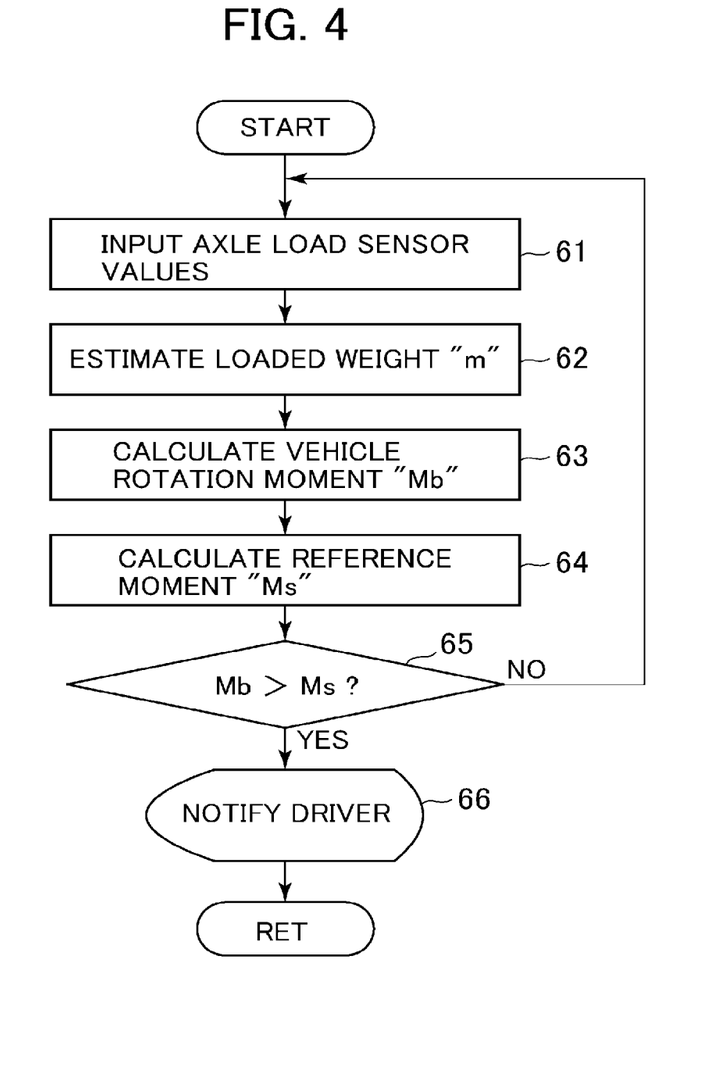
FIG. 4 is a flow chart showing the flow of a process for judging the probability of an overturn of the vehicle which is executed by the dump vehicle overturn preventing device in accordance with the first embodiment of the present invention.

Next, the operation of the dump vehicle overturn preventing device configured as above will be described below. FIG. 4 is a flow chart showing the flow of a process for judging the probability of overturning of the vehicle which is executed by the dump vehicle overturn preventing device in accordance with the first embodiment of the present invention.

The process shown in FIG. 4 is started when a switch (unshown) for tilting the body 3 is operated to discharge the load 7. First, the main control device 40 inputs the load data acquired by the axle load sensors 31A and 31B (sensor values) to the loaded weight estimation unit 32 and the reference moment calculation unit 34 (step 61). Subsequently, the loaded weight estimation unit 32 estimates the loaded weight "m" from the load data acquired by the axle load sensors 31A and 31B (step 62). The vehicle rotation moment calculation unit 33 calculates the vehicle rotation moment Mb using the loaded weight "m" estimated by the loaded weight estimation unit 32 (step 63).

Meanwhile, the reference moment calculation unit 34 calculates the barycentric position of the vehicle from the load data of the axle load sensors 31A and 31B acquired in the step 61, calculates the overturn threshold moment Ml using the barycentric position, and sets the reference moment Ms based on the overturn threshold moment Ml (step 64).

After the step 64 is finished, the judgment unit 35 compares the vehicle rotation moment Mb calculated in the step 63 with the reference moment Ms calculated in the step 64 (step 65). If the vehicle rotation moment Mb is equal to or lower than the reference moment Ms, the process returns to the step 61 and the subsequent steps are repeated. In contrast, if the vehicle rotation moment Mb is greater than the reference moment Ms in the step 65, the information indicating a strong probability of an overturn of the vehicle is displayed on display device 37 for the driver (step 66). Thereafter, the process from the step 61 is repeated. As above, according to this embodiment, it is possible to present information that can prompt the driver to make a rational situational judgment in regard to the risk of an overturn of the vehicle.

As described above, in the dump vehicle overturn preventing device in accordance with the present invention, when the load (object of transportation) 7 (e.g., earth and sand) is discharged by tilting the body 3, the reference moment Ms is set by calculating the overturn threshold moment MI, which is the moment at the instant the vehicle is to overturn (i.e., at the instant the vertical load on the front wheels 1 falls below 0 due to the movement of the barycentric position), from the barycentric position determined from the load distribution measured by the axle load sensors 31A and 31B and already-known positional data of the wheels 1 and 2. Further, the vehicle rotation moment Mb around the support shaft 6 caused by the movement of the load upon its discharging is calculated from the loaded weight "m" estimated by the loaded weight estimation unit 32, already-known shape data of the body 3 and already-known positional data of the body support shaft 6. Then, the magnitude relationship between the vehicle rotation moment Mb and the reference moment Ms is judged. With this operation, information on the danger of overturning of the vehicle, considering not only the static balance (overturn caused by the lifting of either the front wheels 1 or the rear wheels 2 due to the movement of the barycentric position) but also the dynamic balance (overturn caused by the lifting of the front wheels 1 due to the rotation moment caused by the movement of the load upon its discharging), can be presented to the driver via the display device 37. The driver notified of the danger of the vehicle overturn via the display device 37 can take countermeasures such as reducing the expansion speed of the hoist cylinders 5 or stopping the expansion of the hoist cylinders 5, whereby overturning of the vehicle caused by the load 7 sliding down from the body 3 in a lump can be prevented.

Here, effects of the open/close control of the switch 36 in the above embodiment (conducted by the angle judgment unit 11 depending on the tilt angle of the body 3) will be explained. In this control, the switch 36 is closed only when the angle judgment unit 11 judges that the tilt angle of the body 3 has exceeded the preset angle. Therefore, the warning that there is a strong probability of a vehicle overturn is displayed on the display device 37 only when the tilt angle of the body 3 is greater than the preset angle and the vehicle rotation moment Mb is greater than the reference moment Ms. Thus, when the tilt angle of the body 3 is small, the notification of the warning is stopped since the probability of occurrence of a great vehicle rotation moment Mb is low. When the tilt angle of the body 3 is large and the load 7 remains on the body 3, the warning is issued since the probability of occurrence of a great vehicle rotation moment Mb (caused by the sliding down of the load 7 in a lump) exceeding the reference moment Ms (overturn threshold moment MI) is high. As a result, unnecessary issuance of warnings can be reduced and the driver can receive a warning only when it is highly necessary.

In addition, effects of the control of the expansion speed of the hoist cylinders 5 in the above embodiment (conducted by the cylinder controller 39 depending on the vehicle rotation moment Mb) will be explained below. In this control, the reduction of the tilting speed of the body 3 or the stoppage of the tilting of the body 3 can be conducted automatically in response to the judgment by the judgment unit 35 that the probability of the vehicle to overturn is high. Thus, it becomes possible to automatically stabilize the chassis when the probability of occurrence of a great vehicle rotation moment Mb (due to the sliding down of the load 7 in a lump) gets high. As a result, overturning of the vehicle can be prevented with high reliability.

Figure 5:
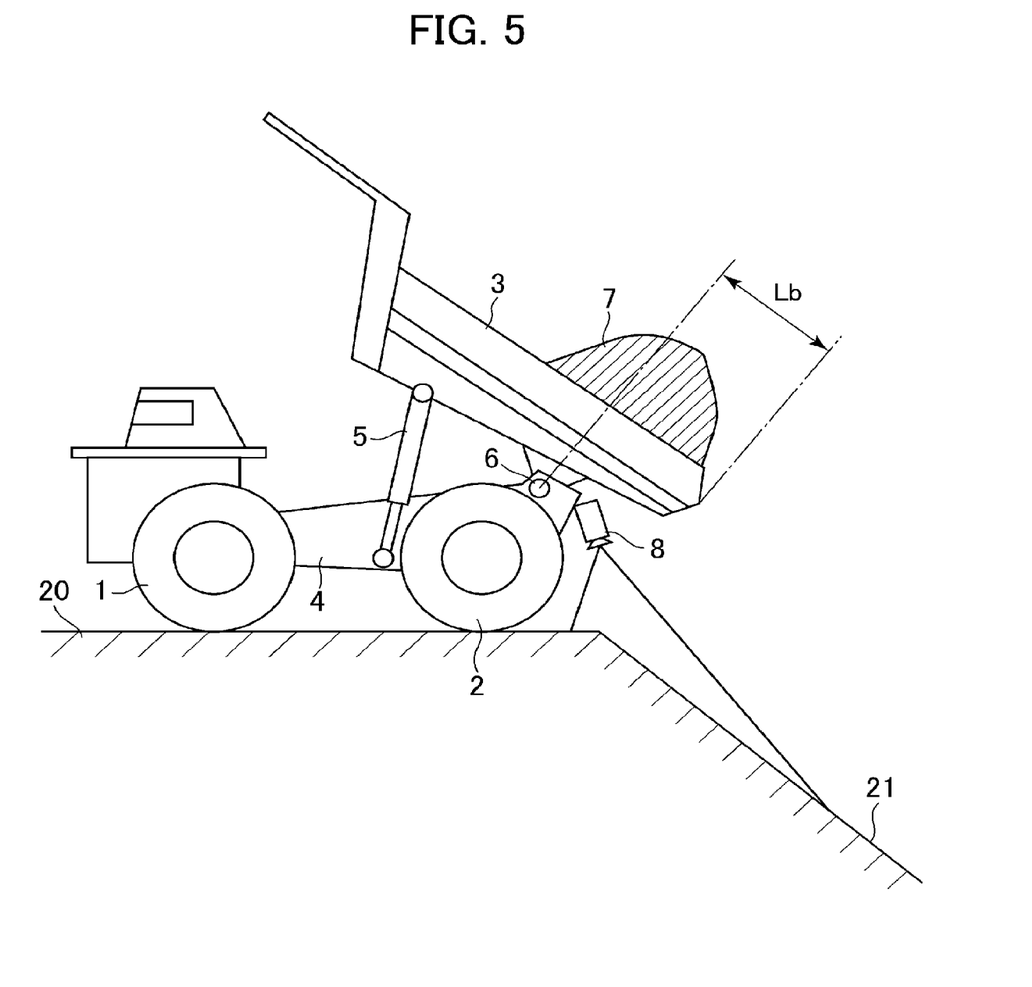
FIG. 5 is a side view of a dump vehicle in accordance with a second embodiment of the present invention when the dump vehicle is discharging the load.

Next, a second embodiment of the present invention will be described in details. FIG. 5 is a side view of a dump vehicle in accordance with the second embodiment of the present invention when the dump vehicle is discharging the load. In FIG. 5, elements identical with those in the foregoing figures are assigned the same reference characters and repeated explanations thereof are omitted for brevity (ditto for subsequent figures).

In FIG. 5, the shoulder of the road has a road surface part 20 and a slope face part 21 formed to have a falling gradient with respect to the road surface part 20. The dump vehicle is parked on the road surface part 20, with its rear (load discharging part of the vehicle) facing the slope face part 21. The dump vehicle is equipped with a road shoulder shape sensor (road shoulder shape measurement means) 8.

The road shoulder shape sensor 8 is a sensor for measuring the distance from the vehicle to the slope face part 21 behind the vehicle and the shape of the road shoulder. The road shoulder shape sensor 8 is attached to the rear part of the dump vehicle. More specifically, the road shoulder shape sensor 8 in this embodiment measures the distance from the ground contacting position of the rear wheels 2 (where the rear wheels 2 contact the ground) to the slope face part 21 and the shape of the road shoulder (road surface part 20, slope face part 21) and converts the measured distance and shape into data. In the following explanation, the data regarding the distance and the shape may be referred to as "road shoulder shape data". The road shoulder shape data measured by the road shoulder shape sensor 8 is outputted to a road shoulder strength calculation unit 54 (explained later) of a main control device 40A.

Incidentally, the road shoulder shape sensor 8 may be a laser radar, etc. The laser radar optically measures the distance from the sensor 8 to the road shoulder with for instance an infrared laser beam and acquires the road shoulder shape data based on a sequence of points obtained by the measurement. The road shoulder shape sensor 8 may also be a distance detecting device that uses a millimeter wave array or an ultrasonic array, an image recognition device that extracts distance information by processing images shot by an image pickup device (camera), etc. It is desirable that the road shoulder shape sensor 8 is set at a position as high as possible at the rear of the vehicle in order to facilitate the measurement of the shapes of the road surface part 20 and the slope face part 21.

Figure 6:
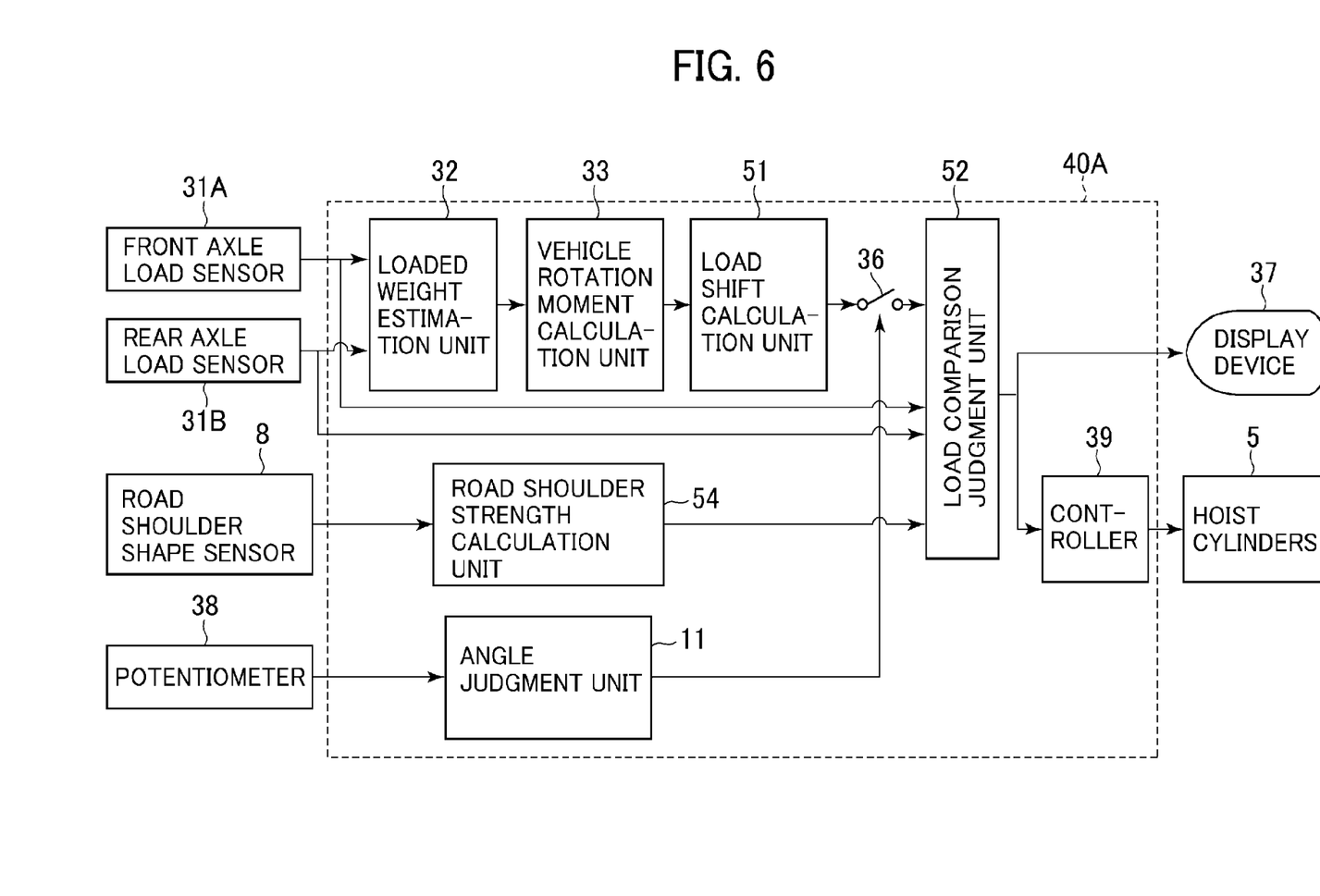
FIG. 6 is an overall block diagram of a dump vehicle overturn preventing device in accordance with the second embodiment of the present invention.

FIG. 6 is an overall block diagram of a dump vehicle overturn preventing device in accordance with the second embodiment of the present invention. The overturn preventing device shown in this figure is equipped with a main control device 40A. The main control device 40A includes a load shift calculation unit (load shift calculation means) 51, a road shoulder strength calculation unit (road shoulder strength calculation means) 54 and a load comparison judgment unit (load comparison judgment means) 52, in addition to the loaded weight estimation unit 32, the vehicle rotation moment calculation unit 33, the angle judgment unit 11 and the cylinder controller 39 explained above.

The load shift calculation unit 51 is connected with the vehicle rotation moment calculation unit 33. Based on the vehicle rotation moment Mb calculated by the vehicle rotation moment calculation unit 33, the load shift calculation unit 51 calculates the load shift ΔFr of the rear wheels 2 caused by the vehicle rotation moment Mb. The load shift calculation unit 51 in this embodiment calculates the load shift ΔFr of the rear wheels 2 by dividing the vehicle rotation moment Mb by the wheelbase Lw (ΔFr=Mb/Lw). The calculated load shift ΔFr is outputted to the load comparison judgment unit 52 which is connected with the load shift calculation unit 51.

The road shoulder strength calculation unit 54 is connected with the road shoulder shape sensor 8. The road shoulder strength calculation unit 54 calculates the withstand load of the road shoulder where the vehicle is situated (road shoulder withstand load W) based on the road shoulder shape data measured by the road shoulder shape sensor 8. Here, the road shoulder withstand load W represents the maximum value of a load applied to the road shoulder at which the road shoulder would not collapse. The magnitude of the road shoulder withstand load W is calculated by using an internal frictional angle φ (see FIG. 7) determined substantially by the type of the earth/sand forming the road shoulder as will be explained below.

Figure 7:
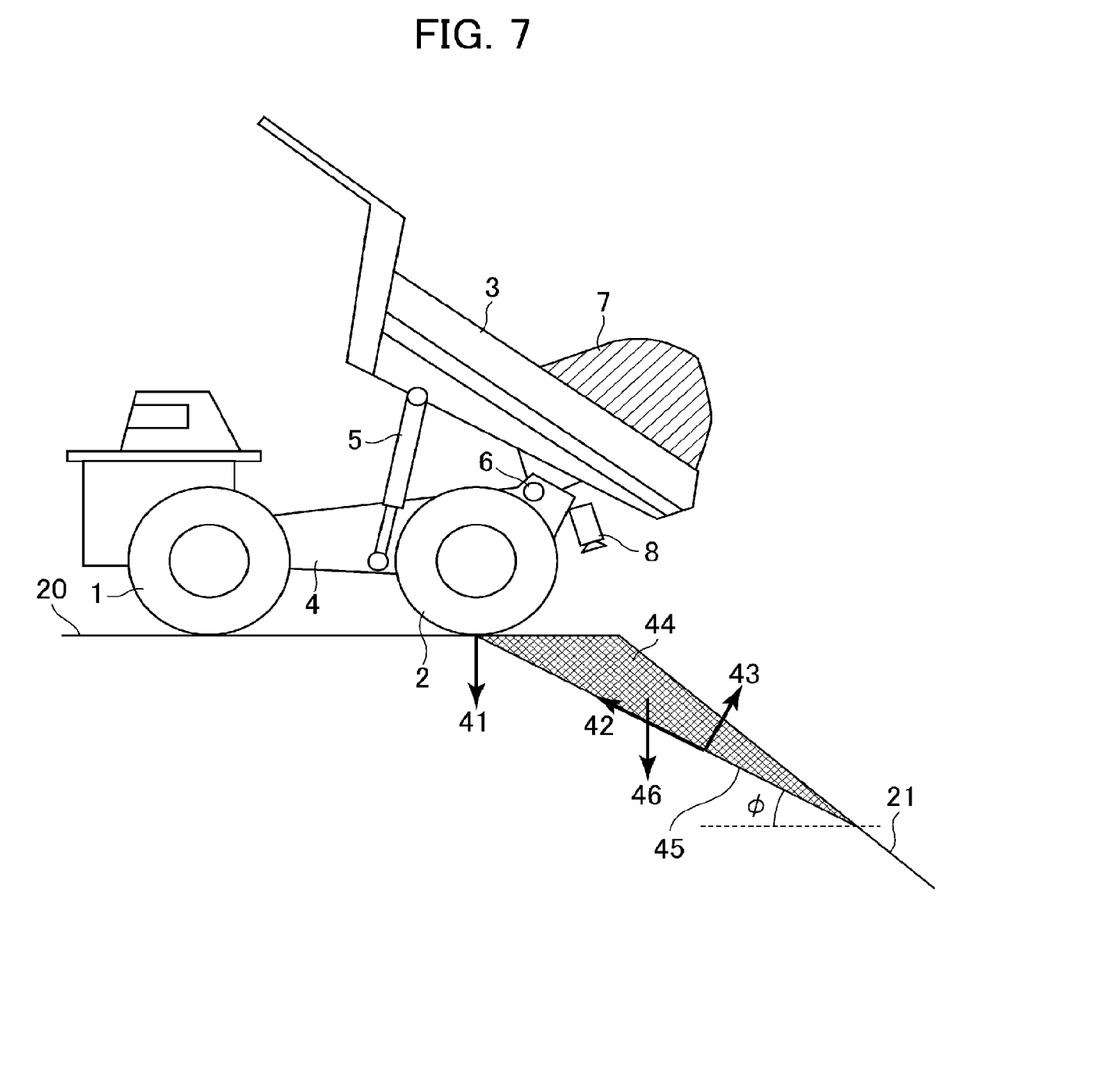
FIG. 7 is a schematic diagram showing the idea of road shoulder strength calculation employed in the second embodiment of the present invention.

FIG. 7 is a side view schematically showing the idea of the road shoulder strength calculation employed in the present invention. The internal frictional angle φ shown in this figure is an angle that naturally appears when the earth and sand crumble and defines a sliding plane 45. Collapse of the earth/sand 44 on the sliding plane 45 can be avoided if the magnitude of friction 42 caused by a vertical load 43 is greater than a component of the resultant force of a load 46 by the earth/sand 44 and an axle load 41 by the vehicle's rear wheels 2 in the direction of the sliding plane 45. Thus, the road shoulder withstand load W to be calculated is the magnitude of the axle load 41 where the magnitude of the component of the resultant force becomes equal to the friction 42. Since the internal frictional angle φ is a value that is determined by the type of the earth/sand as mentioned above, the load 46 by the earth/sand 44 can be calculated by using the angle of the slope face part 21 and the distance from the rear wheels 2 to the slope face part 21 which are acquired from the road shoulder shape data inputted from the road shoulder shape sensor 8, and the road shoulder withstand load W can be calculated using the calculated load 46. The calculated road shoulder withstand load W is inputted to the load comparison judgment unit 52 connected to the road shoulder strength calculation unit 54.

The load comparison judgment unit 52 is a component for judging whether or not a maximum rear axle load FR, which is calculated based on the rear axle load Fr detected by the rear axle load sensor 31B and the load shift ΔFr calculated by the load shift calculation unit 51, has exceeded the road shoulder withstand load W calculated by the road shoulder strength calculation unit 54. The load comparison judgment unit 52 in this embodiment determines the maximum rear axle load FR by adding the load shift ΔFr calculated by the load shift calculation unit 51 and the rear axle load Fr measured by the rear axle load sensor 31B (FR=Fr+ΔFr), and judges the presence/absence of a margin of the road shoulder strength by comparing the maximum rear axle load FR with the magnitude of the road shoulder withstand load W calculated by the road shoulder strength calculation unit 54. In short, the load comparison judgment unit 52 judges the probability of an overturn of the vehicle by using the following expression (6).

$$Fr+\Delta Fr>W \quad (6)$$

When the expression (6) is judged to hold by the load comparison judgment unit 52, it is highly probable that the road shoulder collapses and the vehicle overturns when the load 7 is discharged in a lump. The load comparison judgment unit 52 thus transmits a signal to the display device 37 to display information indicating that there is a strong probability of a vehicle overturn. Similarly to the first embodiment, the load comparison judgment unit 52 may also be configured to transmit a signal for reducing the expansion speed of the hoist cylinders 5 or for stopping the expansion of the hoist cylinders 5 to the cylinder controller 39 in addition to or in place of the signal transmitted to the display device 37.

Figure 8:
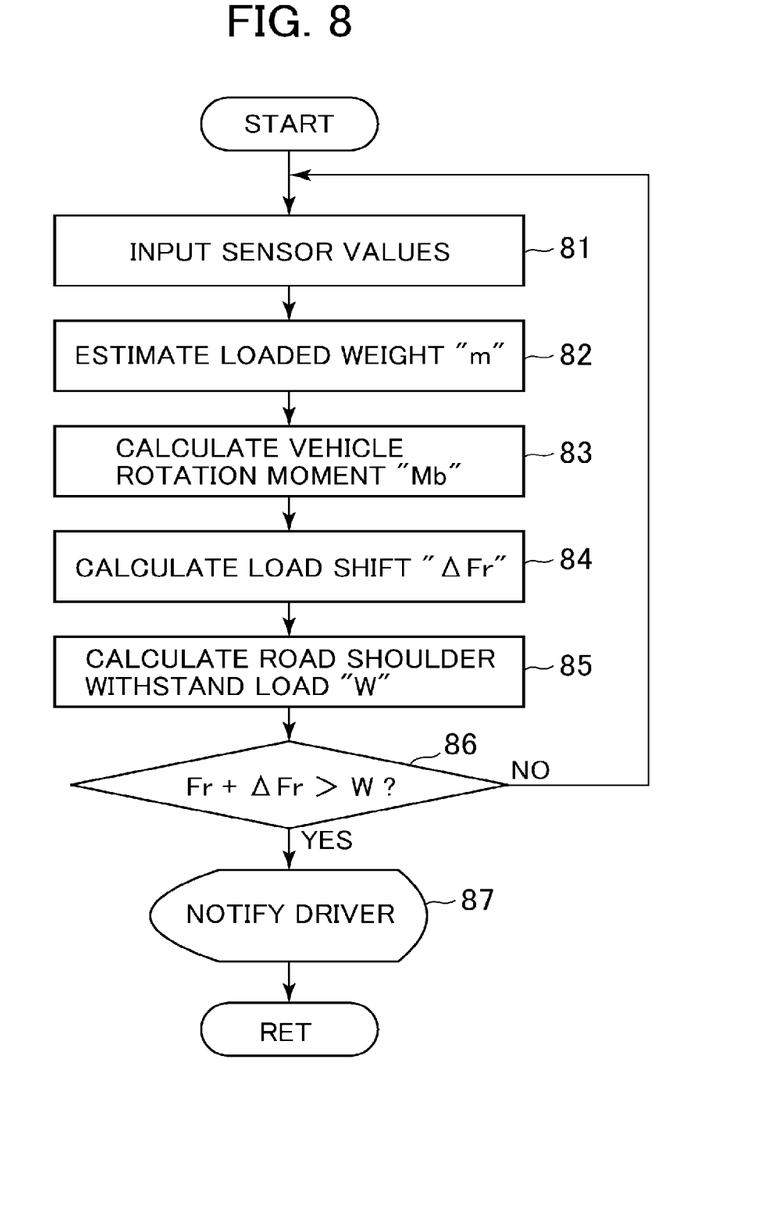
FIG. 8 is a flow chart showing the flow of a process for judging the probability an overturn of the vehicle which is executed by the dump vehicle overturn preventing device in accordance with the second embodiment of the present invention.

Next, the operation of the dump vehicle overturn preventing device configured as above will be described below. FIG. 8 is a flow chart showing the flow of a process for judging the probability of an overturn of the vehicle executed by the dump vehicle overturn preventing device in accordance with the second embodiment of the present invention.

The process shown in FIG. 8 is started when the switch (unshown) for tilting the body 3 is operated in order to discharge the load 7. First, the main control device 40A inputs the load data and the road shoulder shape data acquired by the axle load sensors 31A and 31B and the road shoulder shape sensor 8 (sensor values) to the loaded weight estimation unit 32, the road shoulder strength calculation unit 54 and the load comparison judgment unit 52 (step 81).

Subsequently, the loaded weight estimation unit 32 estimates the loaded weight "m" from the load data acquired by the axle load sensors 31A and 31B (step 82). The vehicle rotation moment calculation unit 33 calculates the vehicle rotation moment Mb using the loaded weight "m" estimated by the loaded weight estimation unit 32 (step 83). Then, the load shift calculation unit 51 calculates the load shift ΔFr by dividing the vehicle rotation moment Mb calculated by the vehicle rotation moment calculation unit 33 by the wheelbase Lw of the vehicle (step 84).

Meanwhile, the road shoulder strength calculation unit 54 extracts the angle of the slope face part 21 and the distance from the rear wheels 2 to the slope face part 21 from the road shoulder shape data acquired in the step 81, and calculates the road shoulder withstand load W by using the extracted angle and distance, the internal frictional angle φ, etc. (step 85).

After the step 85 is finished, the load comparison judgment unit 52 calculates the maximum rear axle load FR by adding the rear axle load Fr acquired in the step 81 and the load shift ΔFr calculated in the step 84, and compares the calculated maximum rear axle load FR with the road shoulder withstand load W calculated in the step 85 (step 86). When the maximum rear axle load FR is equal to or lower than the road shoulder withstand load W, the process returns to the step 81 and the subsequent steps are repeated. In contrast, when the maximum rear axle load FR is greater than the road shoulder withstand load W in the step 86, the information indicating a strong probability of a vehicle overturn is displayed on the display device 37 for the driver (step 87). Thereafter, the process from the step 81 is repeated. As above, according to this embodiment, it is possible to present information that can prompt the driver to make a rational situational judgment in regard to the risk of an overturn of the vehicle.

Incidentally, this embodiment has been designed in consideration of the following point: The site where a dump vehicle discharges its load is in many cases situated at the edge of a vertical hole for dumping earth, sand, etc. (so-called "pit") and the ground of the road shoulder may be fragile in some cases. Especially when the site is a pit where the ground is unpaved and no measures such as reinforcement have been taken for the slope face of the road shoulder, the load acting on the road shoulder via the rear wheels suddenly increases when the load slides down from the body in a lump as in the first embodiment. The risk of the vehicle to overturn by collapse of the road shoulder is therefore high. In this regard, the overturn preventing device described in Patent Document 1 has no mechanism for dealing with a risk of such road shoulder collapse. The device would operate only after the road shoulder has started to collapse, for which the effect of the device is limited. Thus, the object of the invention pertinent to this embodiment is to provide a dump vehicle overturn preventing device capable of preventing an overturn of a vehicle caused by the sliding down of the load from the body in a lump.

For this purpose, in the dump vehicle overturn preventing device in accordance with this embodiment, the road shoulder strength calculation unit 54 calculates the road shoulder withstand load W based on the road shoulder shape data (the distance from the rear wheels 2 to the slope face part 21, the angle of the slope face part 21, etc.) measured by the road shoulder shape sensor 8. The load comparison judgment unit 52 estimates rational road shoulder collapse risk condition based on a civil engineering basis by comparing the maximum rear axle load FR (the sum of the axle load Fr at the rear wheels 2 and the load shift ΔFr caused by the tilt of the body) with the road shoulder withstand load W. If the risk is high, the load comparison judgment unit 52 notifies of a strong probability of a vehicle overturn via the display device 37. Thus, according to this embodiment, information is provided to the driver such that the driver can make a comprehensive and rational situational judgment (regarding also the strength of the road surface), whereby overturning of the vehicle caused by the load sliding down from the body in a lump can be prevented.

In this embodiment as well, the opening/closing of the switch 36 may also be controlled depending on the tilt angle of the body 3 by operating the angle judgment unit 11 as in the first embodiment. With this configuration, it becomes possible, similarly to the first embodiment, to reduce unnecessary issuance of a warning and to notify the driver of a warning only when the warning is highly necessary. Further, it is also possible to control the expansion speed of the hoist cylinders 5 by the cylinder controller 39 depending on the result of the judgment by the load comparison judgment unit 52 as in the first embodiment. With this configuration, it becomes possible, similarly to the first embodiment, to automatically stabilize the chassis when the probability of occurrence of a great rear axle load gets high. Overturning of the vehicle can thus be prevented with high reliability.

Furthermore, it is also possible to configure a dump vehicle overturn preventing device having the features of both the first and second embodiments, by adding the load shift calculation unit 51, the road shoulder shape sensor 8, the road shoulder strength calculation unit 54 and the load comparison judgment unit 52 to the dump vehicle in accordance with the first embodiment. In this case, in addition to the effects of the first embodiment, the risk of a vehicle overturn caused by collapse of the road shoulder can also be included in the subjects of the judgment, whereby overturning of the vehicle can be prevented still more effectively.

While the best mode for carrying out the present invention has been described above, specific configurations of the present invention are not to be restricted to the above particular illustrative embodiments. It should be understood that design changes, etc. not departing from the spirit and scope of the present invention are naturally included in the present invention.

DESCRIPTION OF REFERENCE CHARACTERS

2 rear wheel
3 body
5 hoist cylinder
7 load
8 road shoulder shape sensor
11 angle judgment unit
21 slope face part
31A front axle load sensor
31B rear axle load sensor
32 loaded weight estimation unit
33 vehicle rotation moment calculation unit
34 reference moment calculation unit
35 judgment unit
37 display device
38 potentiometer (angle sensor)
39 cylinder controller
40 main control device
51 load shift calculation unit
52 load comparison judgment unit
54 road shoulder strength calculation unit
m loaded weight
Mb vehicle rotation moment
Ml overturn threshold moment
Ms reference moment
Fr rear axle load
ΔFr rear axle load shift
FR maximum rear axle load
W road shoulder withstand load

The invention claimed is:

1. An overturn preventing method for a dump vehicle equipped with a body rotatably supported on a frame, and hoist cylinders that expand and contract to rotate the body around a rotation axis, the method comprising the steps of:
    calculating, by a hoist cylinder controller, an overturn threshold moment required to lift front wheels of the dump vehicle off a ground;
    determining, by the hoist cylinder controller, a probability of an overturn of the dump vehicle on a basis of the overturn threshold moment; and
    preventing, by the hoist cylinder controller, the overturn of the dump vehicle upon discharging of loads from the dump vehicle by tilting the body based on the probability.

2. The overturn preventing method for the dump vehicle according to claim 1,
    wherein the overturn threshold moment is calculated based on a distance from rear wheels of the vehicle to a gravity center of the dump vehicle and a total load acting on the front wheels of the dump vehicle.

3. The overturn preventing method for the dump vehicle according to claim 2, further comprising the step of calculating a vehicle rotation moment about the rotation axis caused by movement of the loads on the body upon discharging of the loads based on a weight of the loads on the body,
    wherein the probability of the overturn of the dump vehicle is determined based on the vehicle rotation moment and the overturn threshold moment.

4. The overturn preventing method for the dump vehicle according to claim 3, wherein the probability of the overturn of the dump vehicle is determined by comparing a reference moment set to be not greater than the overturn threshold moment and the vehicle rotation moment.

5. The overturn preventing method for the dump vehicle according to claim 4, wherein the vehicle rotation moment is calculated based on a distance from the rotational axis to a rear end of the body, the weight of the loads, and a tilt angle of the body.

6. The overturn preventing method for the dump vehicle according to claim 4, further comprising the steps of:
    calculating a withstand load of a shoulder of a road where the dump vehicle is on, based on an internal frictional angle of the shoulder and a shape of the shoulder; and determining on a probability of a collapse of the shoulder on a basis of the vehicle rotation moment and the withstand load of the shoulder.

7. The overturn preventing method for the dump vehicle according to claim 6, wherein the probability of the collapse of the shoulder is determined by comparing the withstand load of the shoulder and a value obtained by adding a load shift of the rear wheels calculated on the basis of the vehicle rotational moment to a load acting on the rear wheels.

8. An overturn preventing method for a dump vehicle equipped with a body rotatably supported on a frame, and hoist cylinders that expand and contract to rotate the body around a rotational axis, the method comprising the steps of:
    calculating, by a hoist cylinder controller, a withstand load of a shoulder of a road where the dump vehicle is on based on an internal frictional angle of the shoulder and a shape of the shoulder;
    calculating, by the hoist cylinder controller, a load on the body acting on the shoulder via rear wheels of the dump vehicle;
    determined, by the cylinder controller, a probability of a collapse of the shoulder on a basis of the withstand load on the body of the shoulder and the load acting on the shoulder via the rear wheels; and
    preventing, by hoist cylinder controller, the overturn of the dump vehicle upon discharging of loads from the dump vehicle by tilting the body based on the probability.

9. The overturn preventing method for the dump vehicle according to claim 8, further comprising the step of calculating a load shift of the rear wheels on a basis of a vehicle rotation moment around the rotation axis caused by movement of the loads on the body,
    wherein the load on the body acting on the shoulder via the rear wheels is obtained by adding a load acting on the rear wheels to the load shift of the rear wheels, and
    wherein the probability of the collapse of the shoulder is determined by comparing the load on the body acting on the shoulder via the rear wheels and the withstand load of the shoulder.

\* \* \* \* \*